United States Patent

Asami et al.

[11] Patent Number: 6,116,087
[45] Date of Patent: Sep. 12, 2000

[54] ANGULAR VELOCITY SENSOR

[75] Inventors: Kazushi Asami, Okazaki; Takayuki Ishikawa, Anjo; Muneo Yorinaga, Anjo; Yoshimi Yoshino, Anjo, all of Japan

[73] Assignees: Nippon Soken, Inc., Nishio; DENSO Corporation, Kariya, both of Japan

[21] Appl. No.: 09/208,451

[22] Filed: Dec. 10, 1998

[30] Foreign Application Priority Data

Dec. 11, 1997 [JP] Japan ................................ 9-341460

[51] Int. Cl.$^7$ ...................................................... G01P 9/04

[52] U.S. Cl. ..................................... 73/504.16; 73/504.12

[58] Field of Search ........................... 73/504.12, 504.14, 73/504.15, 504.16; 310/316.01, 321

[56] References Cited

U.S. PATENT DOCUMENTS

| | | | |
|---|---|---|---|
| 5,481,913 | 1/1996 | Ito et al. ................................ | 73/504.16 |
| 5,493,166 | 2/1996 | Kasanami et al. . | |
| 5,719,460 | 2/1998 | Watarai et al. ...................... | 310/316.01 |

FOREIGN PATENT DOCUMENTS 4-106409  4/1992  Japan .

*Primary Examiner*—John E. Chapman
*Attorney, Agent, or Firm*—Pillsbury Madison & Sutro LLP

[57] ABSTRACT

An angular velocity sensor comprises a driving element, a detecting element, and a feedback element, all of which are disposed on an element forming face of an oscillator. An electrostatic capacitance of the feedback element is set to be equal to that of the detecting element. As a result, a synchronous detection circuit can reduce the offset signal due to a phase difference between signals from the feedback element and the detecting element.

26 Claims, 12 Drawing Sheets

FIG. 13
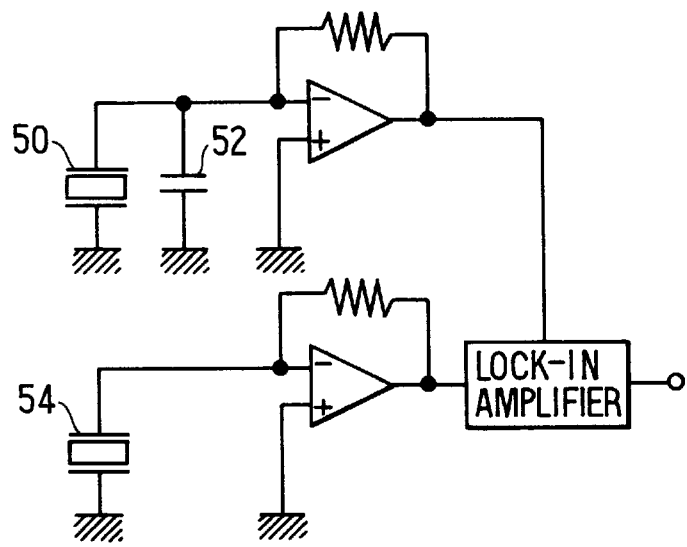
FIG. 14
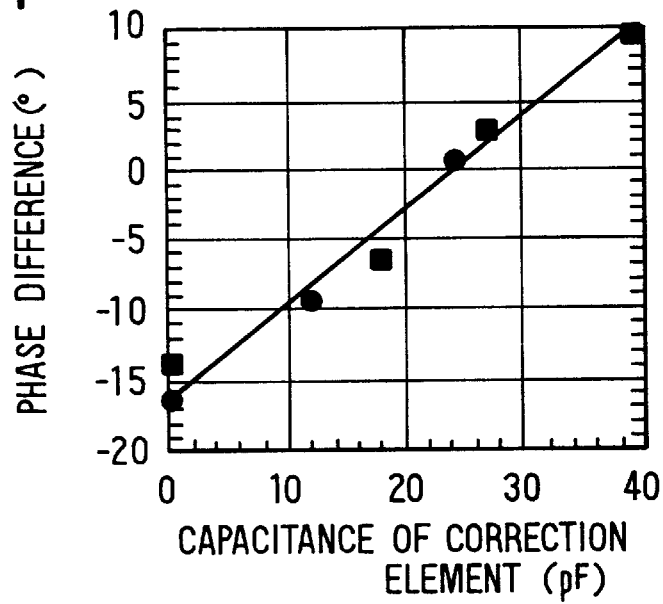
FIG. 15
| | FEEDBACK ELEMENT | DETECTING ELEMENT | CAPACITANCE DIFFERENCE |
|---|---|---|---|
| WITHOUT CORRECTION ELEMENT | 11~12 | 32~34 | 21~22 |
| WITH CORRECTION ELEMENT | 38~40 | 37~39 | ~1 |
UNIT: pF

ANGULAR VELOCITY SENSOR

CROSS REFERENCE TO RELATED APPLICATION

This application is based upon and claims priority from Japanese Patent Application No. Hei. 9-341460 filed Dec. 11, 1997, the contents of which are incorporated by reference.

BACKGROUND OF THE INVENTION

1. Field of the Invention

The present invention relates to an angular velocity sensor for measuring the angular velocity of moving bodies such as vehicles, ships, airplanes, robots and the like. The angular velocity sensor is preferably used, for example, to control an attitude of a vehicle.

2. Related Arts

Conventionally, various types of angular velocity sensors are known. For example, Japanese Patent Application Laid-Open No. 9-105634 teaches a semiconductor type angular velocity sensor fabricated by using silicon micro technique. In detail, an oscillator is formed in a semiconductor substrate by etching a predetermined region of the semiconductor substrate. A driving element for oscillating the oscillator and a detecting element for detecting angular velocity are formed on a surface of the oscillator. The driving element and the detecting element are each formed by laminating a piezoelectric film and an electrode film on the surface of the oscillator. As a result, a small angular velocity sensor can be realized by fabricating an angular velocity sensor using semiconductor manufacturing technique.

Although not taught in the above-mentioned publication, a circuit for driving the driving element by feedback control in accordance with an oscillating state of the oscillator is normally provided to augment the operation of the angular velocity sensor, in order to achieve self-oscillation. The inventors of the present invention prepared a feedback element which indicates the oscillating state of the oscillator in the above-mentioned semiconductor type angular velocity sensor and studied a case in which the driving element is driven by self-oscillation.

FIG. 8 shows a structure of the angular velocity sensor used for the experiment. FIG. 9 is a sectional view taken along a line IX—IX in FIG. 8.

In this angular velocity sensor, a semiconductor oscillator 2 having a shape of a tuning fork is formed at a center portion of a semiconductor substrate and a frame portion 1 is formed encompassing the oscillator 2, by etching a predetermined region of the semiconductor substrate such as a silicon substrate using photolithography technique.

The oscillator 2 is supported by the frame portion 1 so that Z-axis becomes an axis of the angular velocity sensor in a three-axis rectangular coordinate system which includes X-axis, Y-axis, and Z-axis as shown in FIG. 8. The oscillator 2 is formed by a pair of arms 3, 3' extending vertically in parallel to each other and a connecting portion 4 for connecting the arms 3, 3' and for jointing the oscillator 2 to the frame portion 1. Each of the arms 3, 3' is composed of a wide arm portion 5, 5', a narrow arm portion 6, 6', and a mass portion 7, 7'.

Driving elements 8, 8' for oscillating the oscillator 2 in the X-axis direction, detecting elements 9, 9' for producing signals in accordance with an oscillating state of the oscillator 2 in the Y-axis direction, and feedback elements 10, 10' for producing signals in accordance with an oscillating state of the oscillator in the X-axis direction are formed on a front surface of the oscillator 2. Electrode pads 18a, 18a' connected to the driving elements 8, 8' via wires 18b, 18b', electrode pads 19a, 19a' connected to the detecting elements 9, 9' via wires 19b, 19b', and electrode pads 20a, 20a', connected to the feedback elements 10, 10' via wires 20b, 20b' are formed on the frame portion 1. It is to be noted that these wires and electrode pads are made of aluminum.

Further, as shown in FIG. 9, insulation films 11, 11', 12, 12' are formed on the semiconductor substrate constituting the oscillator 2. Piezoelectric materials 9a, 9a' made of ZnO, PZT or the like and electrodes 9b, 9b', are sequentially laminated on the semiconductor substrate between the insulation films 11 and 12, and between the insulation films 11' and 12' by film formation using sputtering process or vapor deposition process, thereby forming the detecting elements 9, 9'. The wires 20b, 20b' connected to the feedback elements 10, 10' are formed on the insulation films 11, 11', respectively. Members forming the detecting elements 9, 9' including the wires 20b, 20b' formed on the insulation films 11, 11' are covered by protective films 13, 13', respectively. It is to be noted that each of the driving elements 8, 8' and the feedback elements 10, 10' is also formed by sequentially laminating the piezoelectric material and the electrode on the semiconductor substrate constituting the oscillator 2, in the similar manner with the detecting elements 9, 9'. The semiconductor type angular velocity sensor thus fabricated is brought into an operating state while the semiconductor substrate thereof is grounded.

The driving elements 8, 8' are located at positions at which a center line of each of the driving electrode 8, 8' running in the X-axis direction is downwardly offset from a center line of the connecting portion 4 running in the X-axis direction. For this arrangement, when alternating current voltage is applied on the electrodes of the driving elements 8, 8' so that each of the driving electrodes 8, 8' repeats expansion and contraction, the pair of arms 3, 3' can be symmetrically oscillated in the X-axis direction.

Further, as is apparent from the drawing, the feedback elements 10, 10' are located at positions offset in a right and left direction of the drawing (i.e., in the X-axis direction) from center lines of the wide arm portions 5, 5' running in the Z-axis direction. For this arrangement, when the oscillator 2 oscillates, alternating current signals having in-phase components are produced by the feedback elements 10 and 10' in response to the oscillation of the oscillator 2.

FIG. 10 shows a diagram of an electric circuit provided to the above-mentioned angular velocity sensor.

Signals produced by the feedback elements 10, 10' are added by an addition and amplification circuit 30. Because the feedback elements 10, 10' produce alternating current signals having in-phase components with respect to the oscillation in the X-axis direction, a composite signal thereof is generated from the addition and amplification circuit 30. It is to be noted that, when the pair of arms 3, 3' oscillate in directions opposite to each other along the Y-axis direction by angular velocity acting around the Z-axis, signals having negative-phase components are respectively produced by the feedback elements 10, 10' with respect to the oscillation in the Y-axis direction. However, such negative-phase components are cancelled through addition carried out by the addition and amplification circuit 30.

The driving elements 8, 8' are driven by applying the alternating current signal generated by the addition and amplification circuit 30. In this way, the driving elements 8, 8' are driven based on the signals from the feedback elements 10, 10' which detect the oscillating state of the oscillator 2 oscillated by the driving elements 8, 8'. Therefore, the driving elements 8, 8' are driven by self-oscillation.

While the driving elements 8, 8' oscillate the oscillator 2 in the X-axis direction, when angular velocity acts around the Z-axis as shown in FIG. 8, Coriolis force is generated at the mass portions 7, 7' in the Y direction. Stress in accordance with the Coriolis force is applied to the detecting elements 9, 9', whereby the detecting elements 9, 9' generate alternating current signals in response thereto. However, the alternating current signals include, in addition to signal components based on the angular velocity, offset noise caused by leakage oscillation and signal flow-around from the driving elements during the oscillation of the oscillator 2.

The alternating current signals from the detecting elements 9, 9' are differentially amplified by the differential amplification circuit 31. After that, the differentially amplified signal is fed to a synchronous detection circuit 33 via a band-pass filter (BPF) 32.

Because the alternating current signal generated from the addition and amplification circuit 30 has a phase difference of 90° from the alternating current signal passing through the BPF 32, the phase of the alternating current signal from addition and amplification circuit 30 is shifted 90° by a 90° phase shifter 34. The synchronous detection circuit 33 synchronously detects the alternating current signal passing through the BPF 32 using the alternating current signal the phase of which is shifted by the 90° phase shifter 34. Noise components other than the signal components based on the angular velocity can be cut away through the synchronous detection. The output signal from the synchronous detection circuit 33 is outputted as a direct current angular velocity signal via a low-pass filter (LPF) 35, a gain adjustment circuit 36, and a zero point adjustment circuit 37.

FIG. 11 shows a specific circuit structure of the addition and amplification circuit 30 and the differential amplification circuit 31. The addition and amplification circuit 30 is composed of buffer amplifiers 30a, 30b and an addition amplifier 30c so that the respective alternating current signals from the feedback elements 10, 10' are added. The differential amplification circuit 31 is composed of buffer amplifiers 31a, 31b and a differential amplifier 31c so that one of the alternating current signals from the detecting elements 9, 9' is subtracted from the other thereof.

In the above-mentioned angular velocity sensor, as the sensor is more downsized, the Coriolis force generated at the mass portions 7, 7' becomes smaller. Accordingly, the magnitude of the signals generated from the detecting elements 9, 9' also becomes smaller. Further, as the size of the oscillator 2 is made smaller, the oscillating frequency thereof becomes higher.

In a case where very weak and high frequency signals are to be dealt with, it is normally considered that areas of the detecting elements 9, 9' are enlarged. However, if the area of the detecting element 9, 9' is larger than that of the feedback element 10, 10', input impedance of the addition and amplification circuit 30 becomes different from input impedance of the differential amplification circuit 31. As a result, a phase difference occurs feedback signal which has been shifted 90° by the 90° phase shifter 34 and a detection signal passing through the BPF 32. That is, when no angular velocity is generated, as shown by wave forms in an upper part and a middle part of FIG. 12, there is caused phase difference between the feedback signal of which the phase thereof is shifted 90° and the detection signal (in this case, offset signal). Due to this phase difference, a wave form of the signal after the synchronous detection is as shown in a lower part of FIG. 12. Therefore, when such a signal is converted to a direct current signal, the offset signal is generated. This offset signal varies depending on temperature of the sensor.

SUMMARY OF THE INVENTION

An object of the present invention is to reduce an offset signal due to phase difference as described above, in a small-sized angular velocity sensor in which a driving element, a detecting element, and a feedback element are disposed on a surface of an oscillator.

In order to achieve the aforementioned object, an angular velocity sensor according to the present invention comprises a driving element, a detecting element, and a feedback element, all of which are disposed on an element forming face of the oscillator. In particular, an electrostatic capacitance of the feedback element is set to be equal to that of the detecting element.

The input impedance of the feedback element relative to its following circuit can be equalized to that of the detecting element relative to its following circuit by making the electrostatic capacitance of the feedback element equal to the electrostatic capacitance of the detecting element. As a result, it is possible to reduce the offset signal due to the phase difference as described above.

The electrostatic capacitance of the feedback element can be equalized to that of the detecting element by making an area of the feedback element equal to an area of the detecting element.

Alternatively, a capacitance correction element may be connected in parallel to the feedback element so that a composite capacitance of the feedback element and the capacitance correction element becomes equal to the electrostatic capacitance of the detecting element.

In the above-described case, when an oscillator and a frame portion for supporting the oscillator are formed by etching a predetermined region of a semiconductor substrate, the capacitance correction element can be formed on a surface of the frame portion.

Further, a detecting element electrode pad connected to the detecting element via a wire may be formed to have a different area from a feedback element electrode pad connected to the feedback element via a wire to compensate capacitance difference between the respective wires. As a result, it is possible to reduce the offset signal with higher accuracy.

It is to be noted that equalizing the electrostatic capacitance of the feedback element to that of the detecting element includes a case in which the electrostatic capacitance of the feedback element is substantially equalized to that of the detecting element, in addition to a case in which the electrostatic capacitance of the feedback element is completely equalized to that of the detecting element.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

FIG. 13 is a circuit diagram illustrating a circuit structure used in an experiment;

FIG. 14 is a graph illustrating relation between phase difference and capacitance of a correction element obtained from the experiment;

FIG. 15 is a table showing capacitance difference between a feedback element and a detecting element before and after the correction element is added;

DESCRIPTION OF THE PREFERRED EMBODIMENTS (First Embodiment)

A first embodiment of the present invention will be described with reference to the accompanying drawings.

Figure 1:
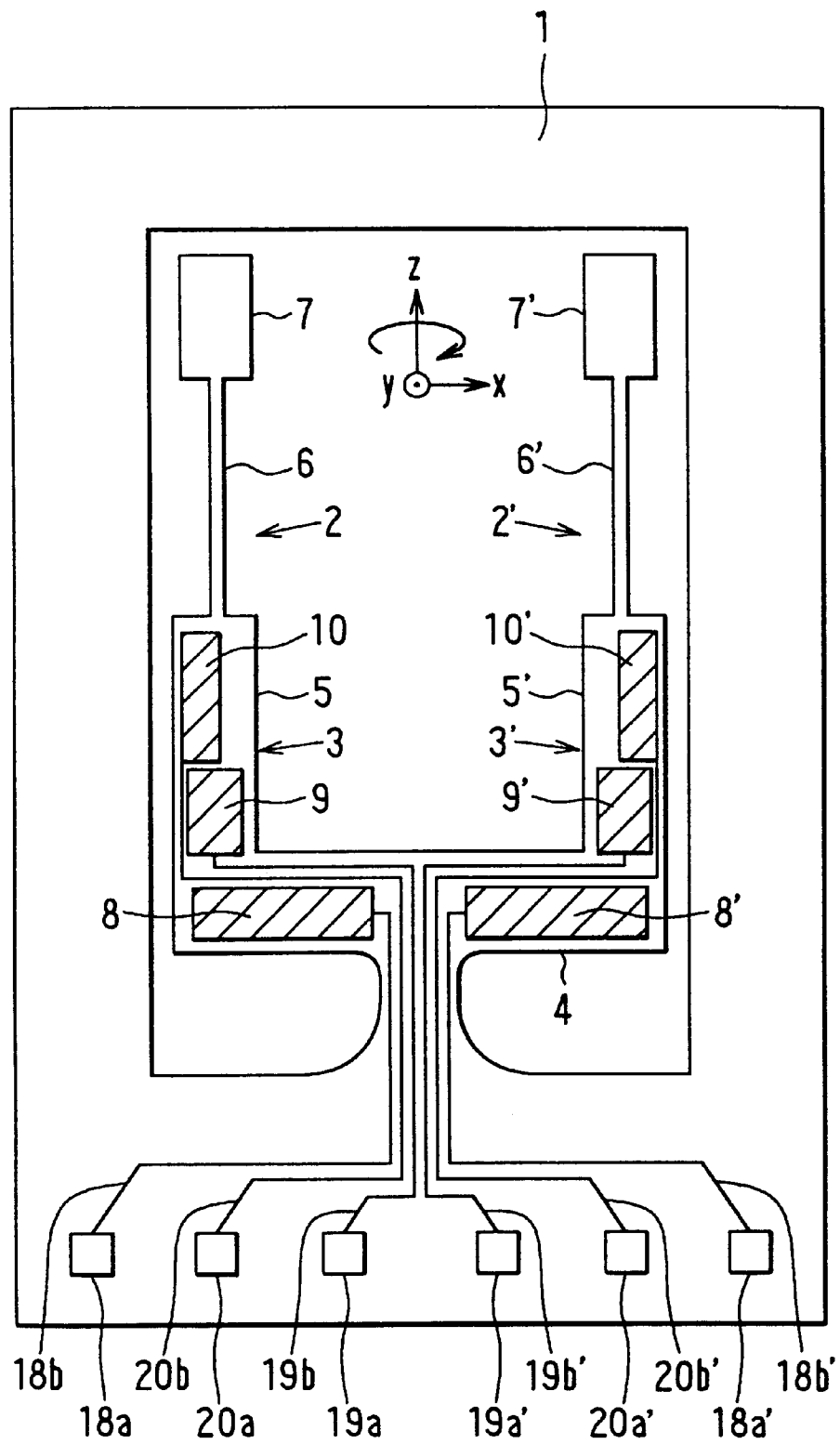
FIG. 1 is a plan view of an angular velocity sensor according to a first embodiment of the present invention.

An angular velocity sensor of the first embodiment is shown in FIG. 1. As shown in FIG. 1, feedback elements 10, 10' are formed to have the same area as detecting elements 9, 9' while center lines of the feedback elements 10, 10' running in a Z-axis direction are offset in an X-axis direction from center lines of the detecting elements 9, 9 running in the Z-axis direction. Those are all of differences between the angular velocity sensors shown in FIGS. 1 and 8, that is, the remaining parts of the angular velocity sensor shown in FIG. 1 are the same as those of the angular velocity sensor shown in FIG. 8, including their circuit structure for processing signals.

The thicknesses of the detecting element 9 (9') and the feedback element 10 (10') are made equal to each other because those are formed by sputtering or vapor-depositing piezoelectric material. Therefore, the electrostatic capacitance of the feedback element 10 (10') can be equalized to the electrostatic capacitance of the detecting element 9, (9'), when the feedback element 10 (10') is formed to have the same area as the detecting element 9 (9').

The input impedance of the addition and amplification circuit 30 can be equalized to that of the differential amplification circuit 31 by making the electrostatic capacitance of the feedback element equal to the electrostatic capacitance of the detecting element. As a result, it is possible to eliminate phase difference between a feedback signal of which the phase is shifted 90° by the 90° phase shifter 34 and a detection signal passing through the BPF 32.

Figure 2:
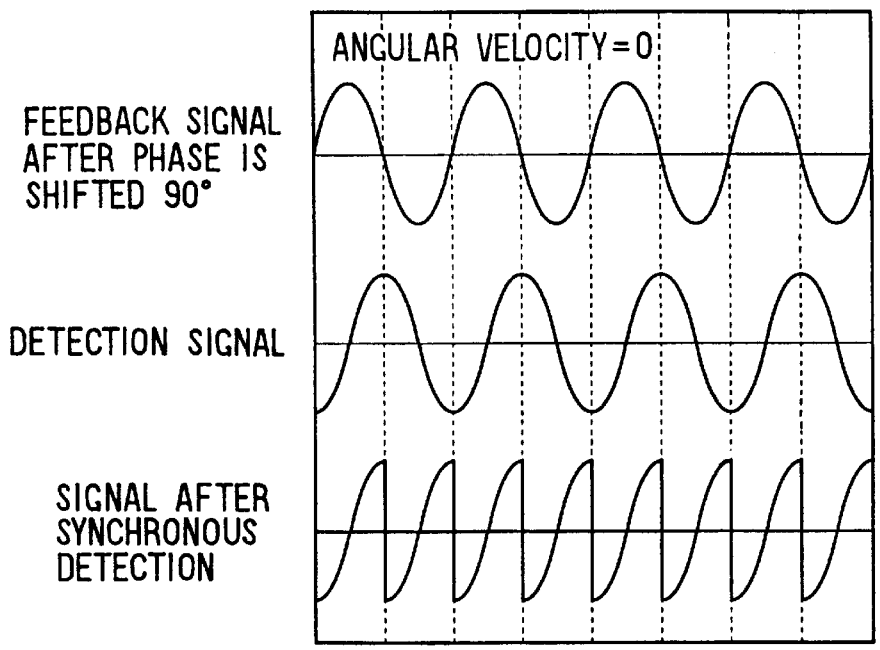
FIG. 2 is a timing diagram illustrating wave forms of a feedback signal of which the phase is shifted 90°, a detection signal, a signal after synchronous detection is carried out when angular velocity is zero.
Figure 3:
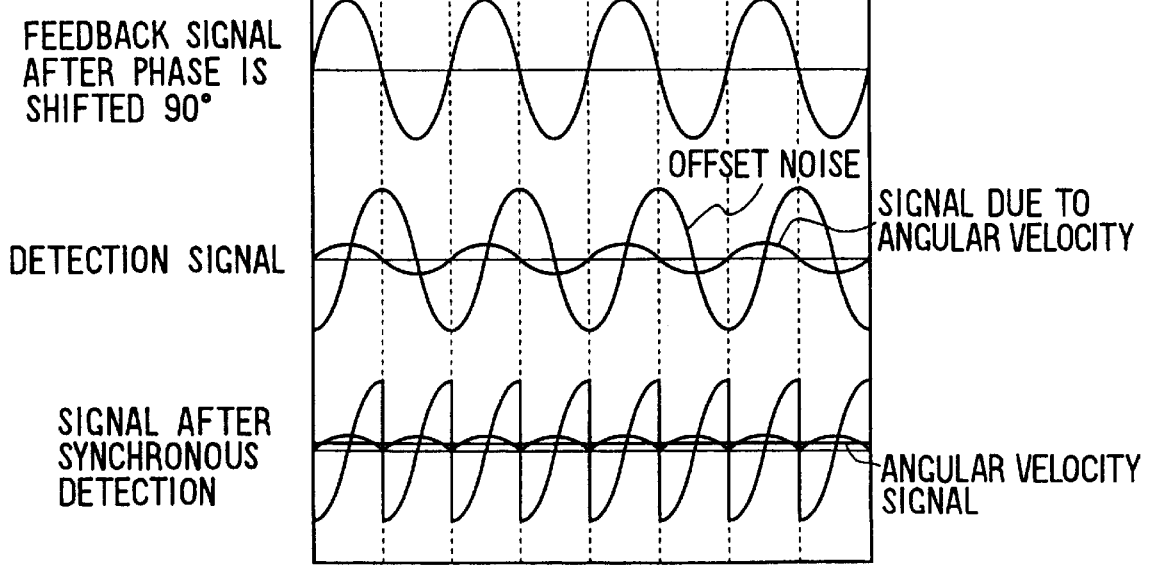
FIG. 3 is a timing diagram illustrating wave forms of the feedback signal of which the phase is shifted 90°, the detection signal, the signal after synchronous detection is carried out when angular velocity is generated.
Figure 4:
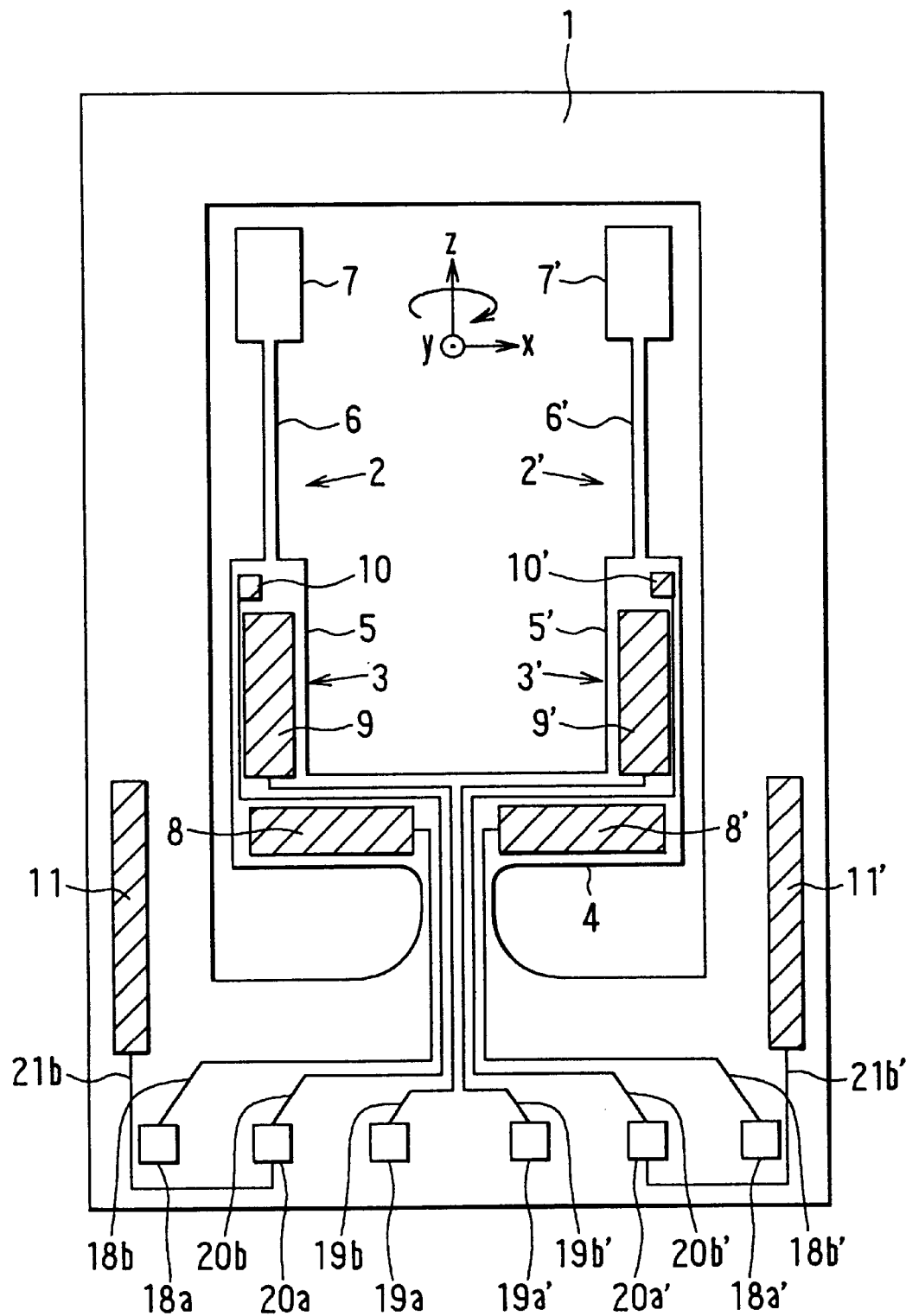
FIG. 4 is a plan view of an angular velocity sensor according to a second embodiment of the present invention.

FIGS. 2 and 3 show wave forms of the feedback signal of which the phase is shifted 90°, the detection signal, and the signal after synchronous detection is carried out. It is to be noted that FIG. 2 shows the wave forms when angular velocity is zero, and FIG. 3 shows the wave forms when angular velocity is generated.

As shown in FIG. 2, the feedback signal of which the phase is shifted 90° and offset noise components in the detection signal are in relation of the phases differing by 90° from each other. For this reason, the offset noise components are cut away in the signal after the synchronous detection is carried out, and a final output signal includes no offset noise components.

Figure 10:
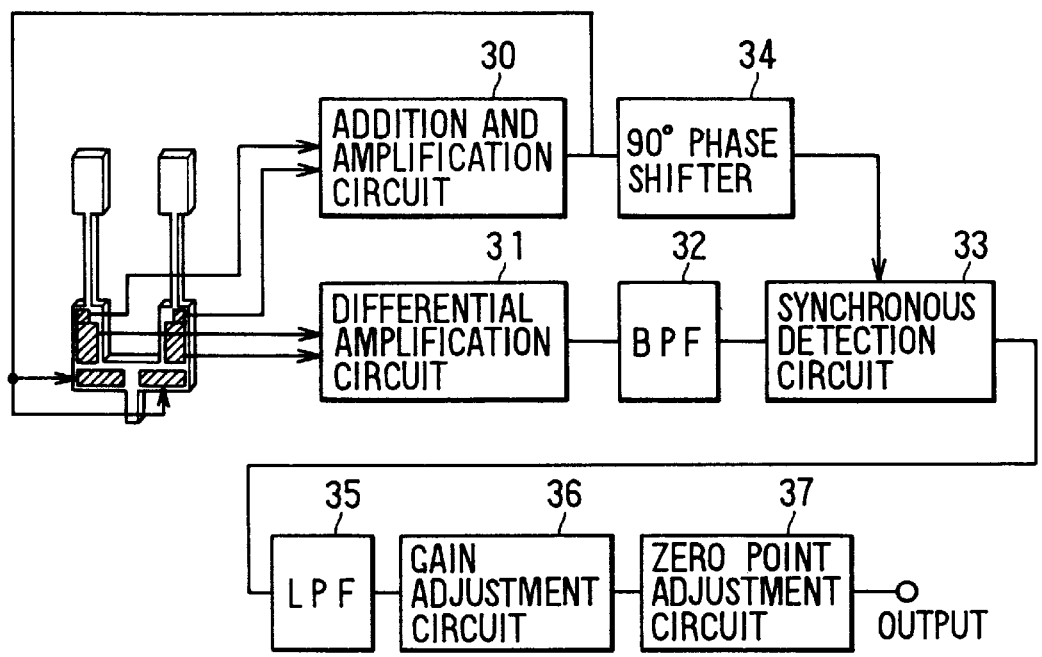
FIG. 10 is a circuit diagram adopted for the angular velocity sensor shown in FIG. 8.
Figure 12:
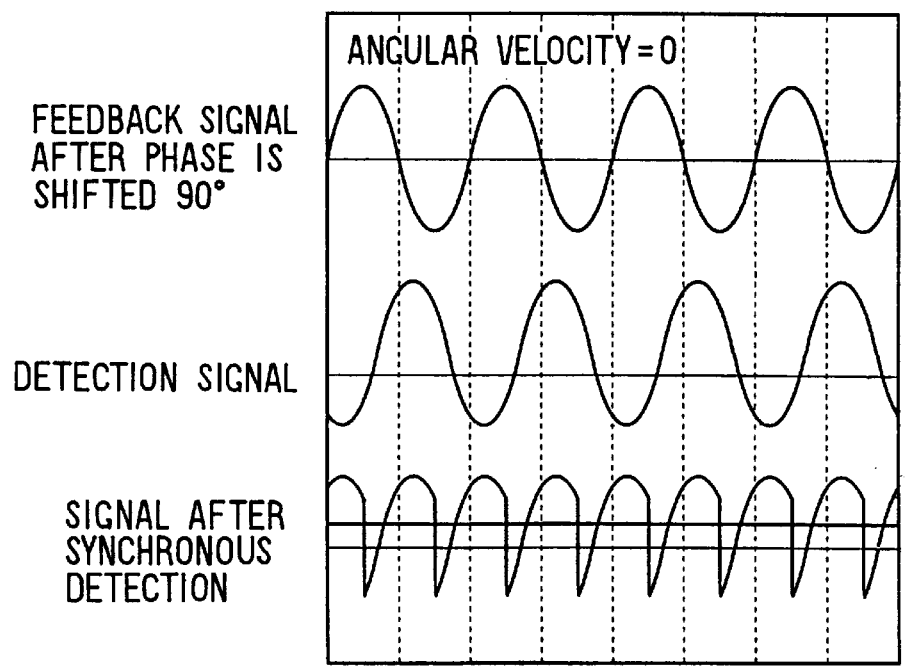
FIG. 12 is a timing diagram for explaining problems of the angular velocity sensor shown in FIG. 8.
Figure 11:
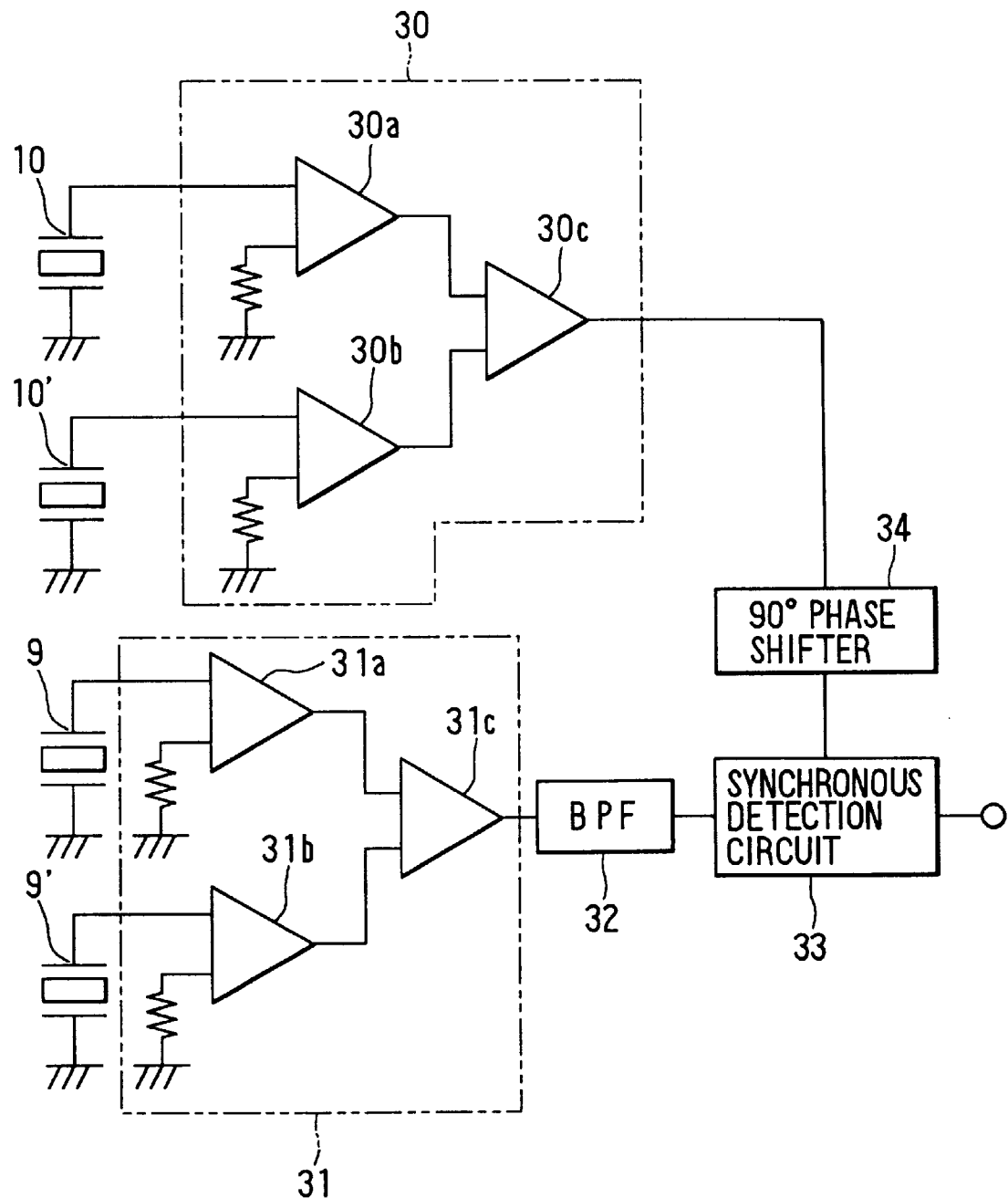
FIG. 11 is a block diagram illustrating specific structure of an addition and amplification circuit 30 and a differential amplification circuit 31 shown in FIG. 10.

When angular velocity is generated, as shown in FIG. 3, signal components due to the angular velocity are superimposed on the offset signal. That is, the detection signal includes the angular velocity signal and the offset signal. However, because the angular velocity signal is in phase with the feedback signal of which the phase is shifted 90°, only the offset signal is eliminated by the synchronous detection, thereby obtaining a direct current angular velocity signal through the circuits shown in FIG. 10.

(Second embodiment)

In the above-described first embodiment, the area of the feedback element 10 (10') is made equal to the area of the detecting element 9 (9'). In this case, however, the area of the detecting element 9 (9') is made smaller than that of the detecting element shown in FIG. 8.

Figure 8:
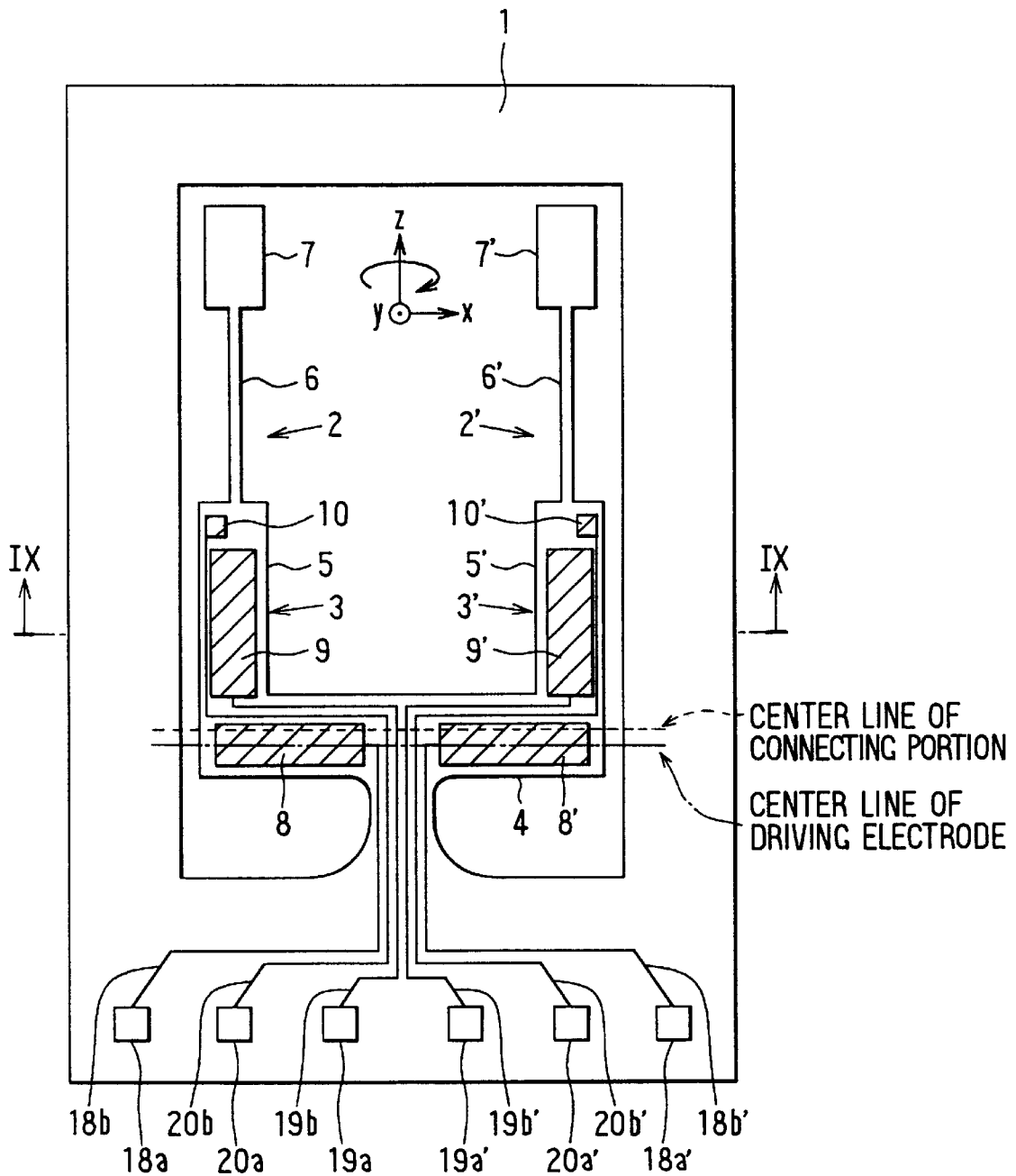
FIG. 8 is a plan view of an angular velocity sensor studied by inventors of the present invention.
Figure 9:
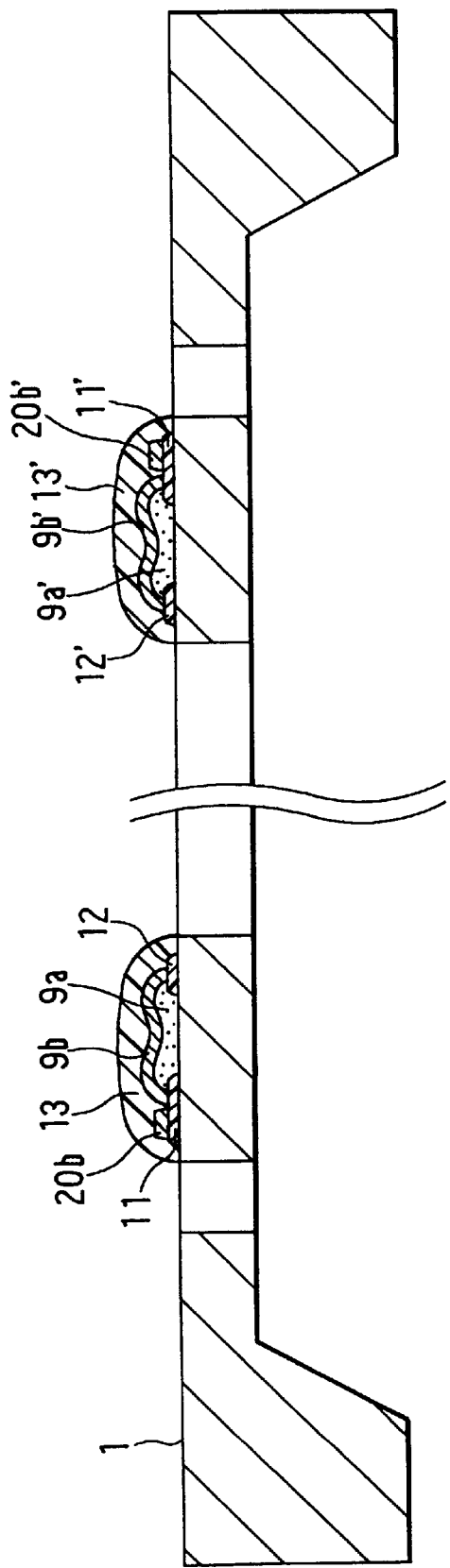
FIG. 9 is a sectional view of the angular velocity sensor taken along a line IX—IX in FIG. 8.

Therefore, in this second embodiment, the detecting elements 9, 9' and the feedback elements 10, 10' the same as those shown in FIG. 8 are adopted. That is, the areas of the detecting elements 9, 9' are made larger than those of the detecting elements of the first embodiment. Further, capacitance correction elements 11, 11' each of which has an area corresponding to a difference in area between the detecting element 9 (9') and the feedback element 10 (10') are formed on the frame portion 1. The capacitance correction elements 11, 11' are electrically connected to the electrode pads 20a, 20a' via wires 21b, 21b', respectively. It is to be noted that the capacitance correction elements 11, 11' are formed by carrying out film formation of a piezoelectric film and electrode film by sputtering or vapor deposition.

Figure 5:
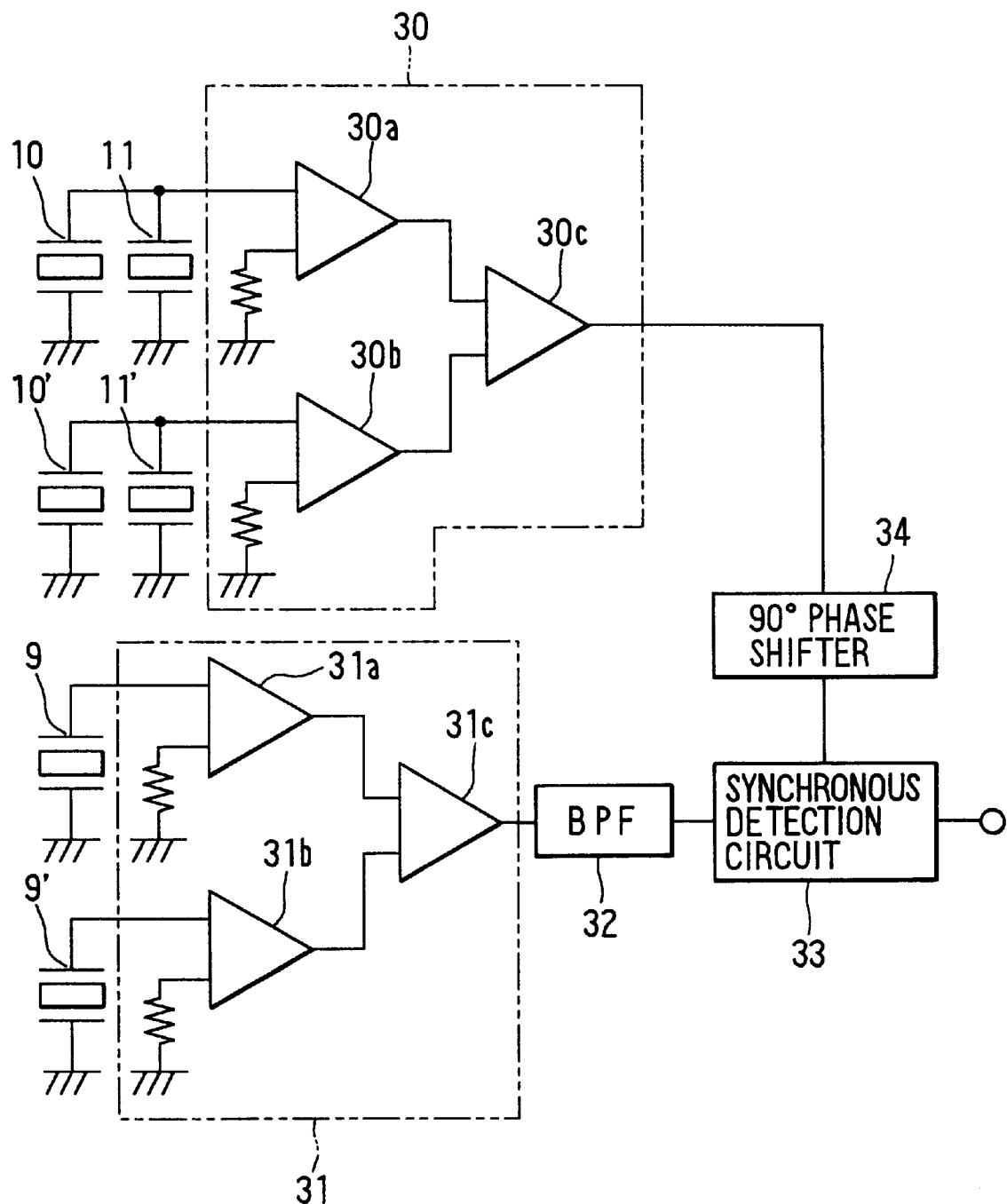
FIG. 5 is a circuit diagram adopted for the angular velocity sensor according to the second embodiment.

In this case, as shown in FIG. 5, the capacitance correction elements 11, 11' are connected in parallel to the feedback elements 10, 10', respectively. The composite capacitance of the capacitance correction element 11 (11') and the feedback element 10 (10') is set to be equal to the capacitance of the detecting element 9 (9').

Figure 6A:
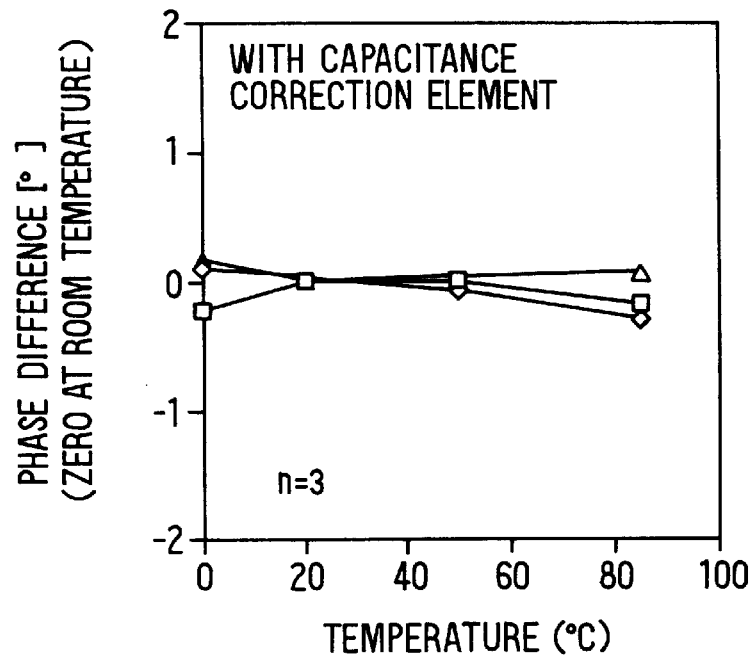
FIGS. 6A and 6B are graphs illustrating variation of phase difference with respect to temperature change in angular velocity sensors shown in FIGS. 7 and 8.
Figure 6B:
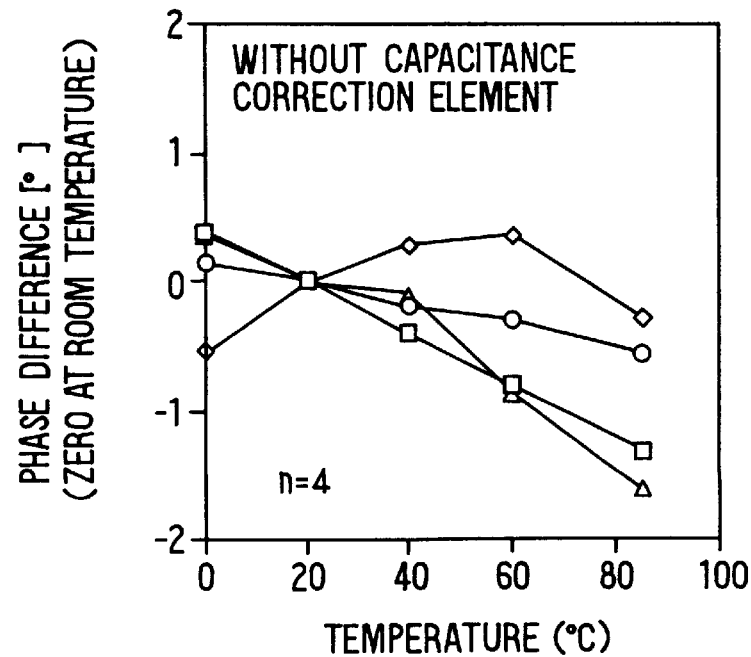
Figure 7:
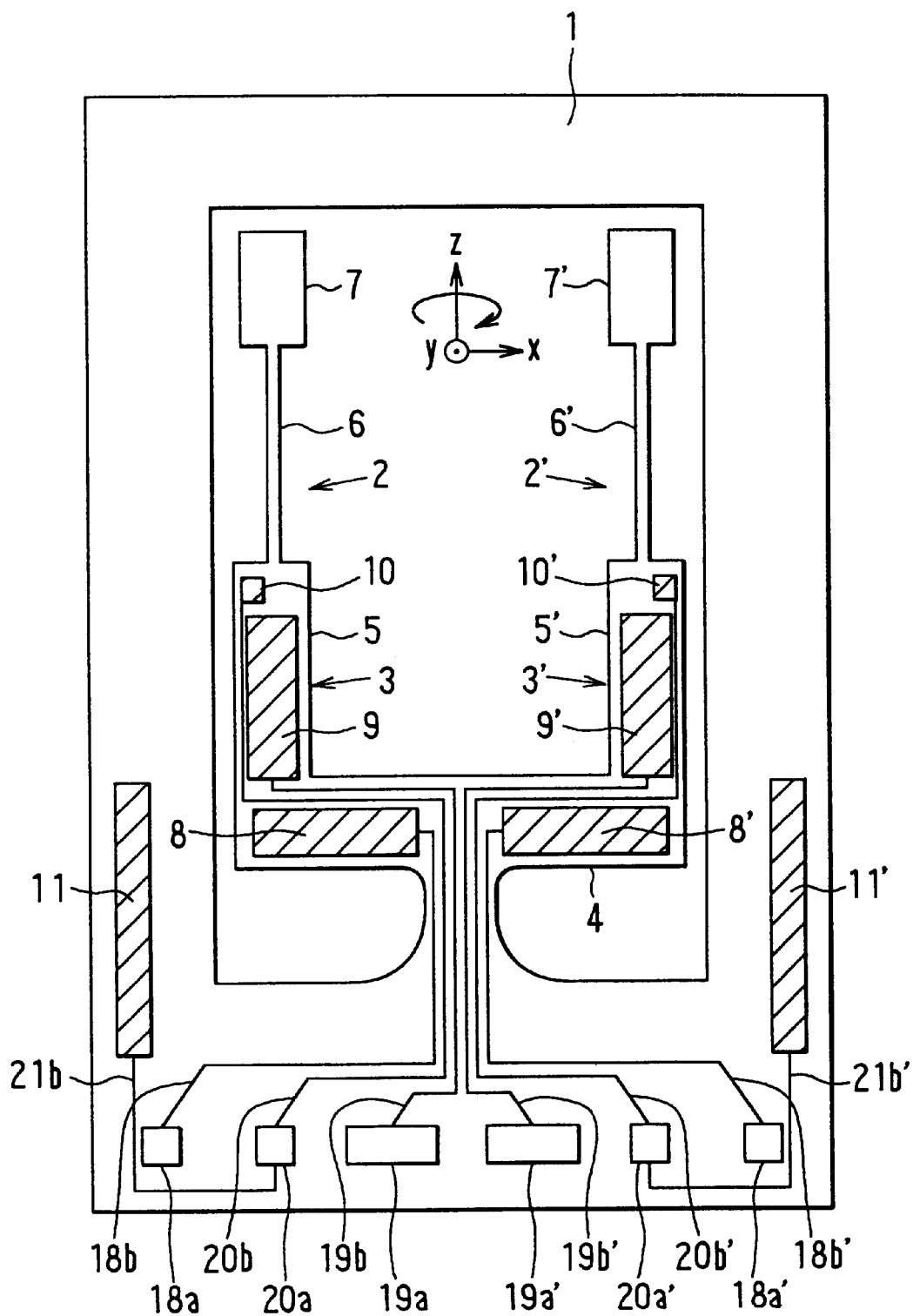
FIG. 7 is a plan view of an angular velocity sensor according to a modification of the second embodiment.

FIGS. 6A and 6B show variation of phase difference between the feedback signal of which the phase is shifted 90° and the detection signal with respect to temperature change in the angular velocity sensor in which the capacitance correction elements 11, 11' are provided (FIG. 6A) and in the angular velocity sensor in which no capacitance correction element is provided as shown in FIG. 8 (FIG. 6B). It is to be noted that the phase difference at room temperature is set to zero. As apparent from FIGS. 6A and 6B, it can be understood that the variation of the phase difference with respect to temperature change is reduced by providing the capacitance correction elements 11, 11'.

Here, an experiment carried out by the inventors is described.

As shown in FIG. 13, a capacitance correction element 52 having the capacitance in a range from 0 pF to 40 pF is connected in parallel to a feedback element 50 having the capacitance of 11–12 pF. The capacitance of the detecting element 54 is 32–34 pF. In this circuit, phase difference between a feedback signal of the feedback element 50 and a detection signal of the detecting element 54 is measured when no angular velocity is generated. As a result, as shown in a graph of FIG. 14, when the capacitance correction element 52 having the capacitance of about 22 pF is connected in parallel to the feedback element 50, the phase difference becomes substantially zero, and as the capacitance of the element 52 is increased or decreased from that value, the phase difference becomes large. That is, the phase difference can be set to zero by making the capacitance of the feedback element 50 equal to that of the detecting element 54.

It is to be noted that the capacitance difference between the detecting element 54 and the feedback element 50 before and after the capacitance correction element 52 is added, is as shown by a table in FIG. 15. The reason why the capacitance of the detecting element 54 is also increased is in that a wiring length for the detecting element 54 is changed.

In view of the experiment result, allowable phase difference between the detection signal and the feedback signal is estimated as follows.

The allowable range of the offset temperature drift which is an issue to be solved is equal to or lower than 20°/second. That is, the signal after the synchronous detection is required to be equal to or lower than 20°/second. The signal after the synchronous detection can be calculated by the following equation.

Signal after synchronous detection=offset noise×sin Δϕ wherein Δϕ designates a temperature characteristic of the phase difference.

When the required value of 20°/second is substituted in the signal after synchronous detection, and 5000°/second is substituted in the offset noise, Δϕ becomes equal to or lower than 0.2° (Δϕ≦0.2°). It is to be noted that the value of 5000°/second is obtained from a voltage value of expected noise. Since the temperature characteristic of the phase difference Δϕ is estimated as 10% of the phase difference ϕ between the detection signal and the feedback signal, the phase difference ϕ becomes equal to or lower than 2°. In other words, when the phase difference ϕ is limited equal to or lower than 2°, the offset noise components included in the detection signal can be sufficiently cancelled by the synchronous detection.

It is preferable that the area of the electrode pad 19a (19a') connected to the detecting element 9 (9') is made different from the area of the electrode pad 20a (20a') connected to the feedback element 10 (10') to compensate capacitance difference between the wire 19b (19b') and the wire 20b (20b'). As a result, it is possible to correct difference in capacitance between the detecting element 9, (9') and the feedback element 10 (10') with higher accuracy. It is to be noted that changing of the electrode pad areas to correct the wire capacitance can be also adopted to the angular velocity sensor according to the first embodiment.

As described above, the electrostatic capacitances of the feedback element 10 (10') and the detecting element 9 (9') can be made equal to each other by equalizing the area of the feedback element 10 (10') to the area of the detecting element 9 (9') or by connecting the capacitance correction element 11 (11') in parallel to the feedback element 10 (10'). For this reason, because it is possible to reduce the phase difference between the detection signal and the feedback signal of which the phase is shifted 90°, the offset signal caused by the phase difference can be reduced. Therefore, offset temperature drift caused by temperature change can be also reduced.

It is to be noted that, although the driving elements 8, 8' are arranged in a right side and a left side in the connection portion 4, as shown in JP-A-9-105634, the driving elements may be arranged in an upper side and a lower side of the connection portion, and alternating current signals of the opposite phases may be applied to the driving elements, respectively.

Also, the present invention can be applied to an angular velocity sensor in which an oscillator is formed by, for example, ceramic, and a driving element, a detecting element and a feedback element are disposed on a surface thereof, in addition to the semiconductor type angular velocity sensor.

Further, the present invention can be also applied to an electrostatic capacitance type angular velocity sensor, in addition to the piezoelectric type angular velocity sensor as described above.

Figure 16:
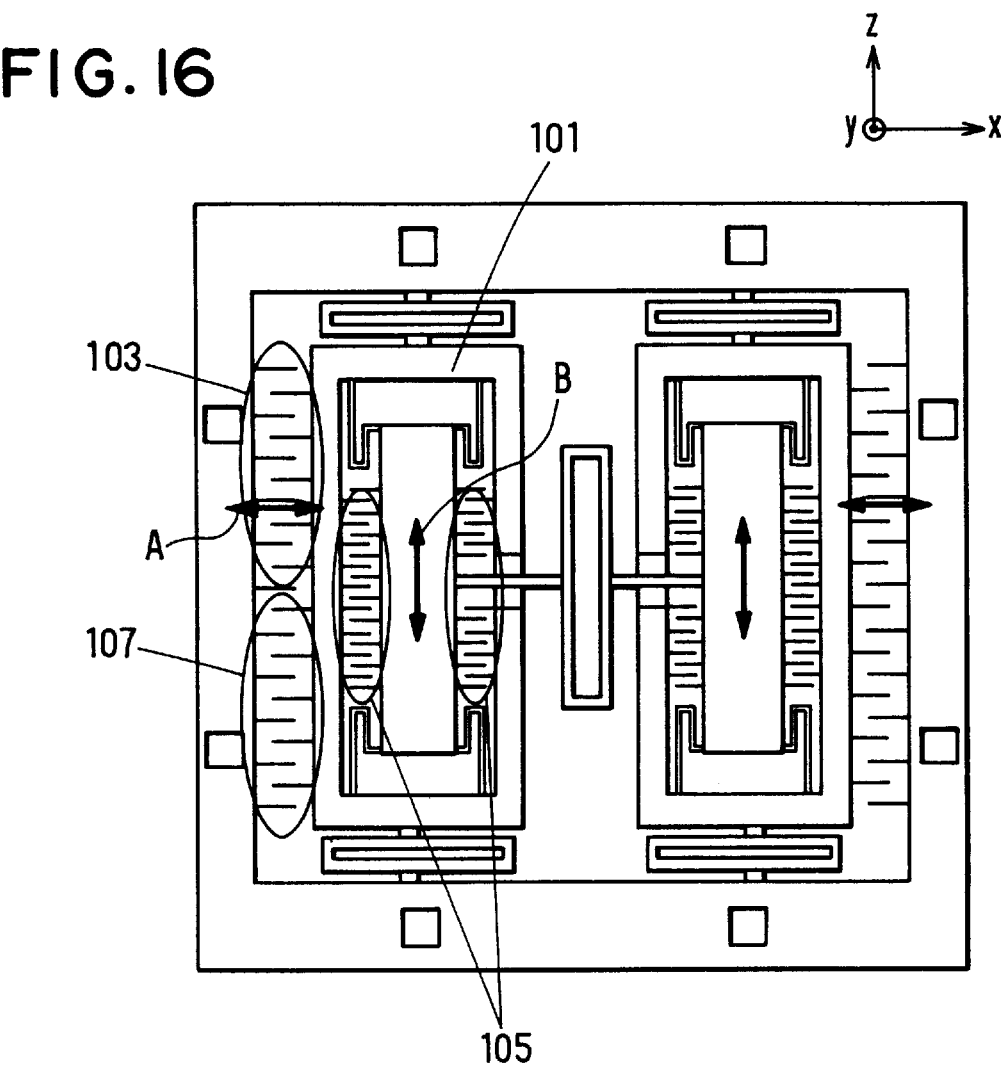
FIG. 16 is a plan view illustrating an electrostatic capacitance type angular velocity sensor.

The electrostatic capacitance type angular velocity sensor is shown in FIG. 16. This angular velocity sensor has a beam structure 101 formed from a semiconductor material and is located a predetermined distance above an upper surface of a substrate. The beam structure 101 is forcibly caused to oscillate in an X-axis direction as shown by an arrow A by electrostatic force between movable electrodes and fixed electrodes of a driving electrode group 103. When angular velocity acts around a Y-axis in FIG. 16, Coriolis force is generated at the beam structure 101 in a Z-axis direction. An angular velocity acting around the Z-axis is detected based on oscillation (displacement) of the beam structure 101 in the Z-axis direction. That is, oscillating state of the beam structure 101 in the Z-axis direction is detected as change of capacitance between movable electrodes and fixed electrodes in a detecting electrode group 105. Further, oscillating state of the beam structure 101 in the X-axis direction is detected as change of capacitance between movable electrodes and fixed electrodes in a feedback electrode group 107.

Further, in this angular velocity sensor, if movable electrodes and fixed electrodes in a detecting electrode group 105 are respectively disposed on a lower surface of the beam structure 101 and on an upper surface of the substrate to face to each other, the detecting electrode group 105 can detect an oscillating state of the beam structure 101 in the Y-axis direction as change of capacitance between the movable electrodes and the fixed electrodes therein. That is, while the beam structure 101 is oscillated in the X-axis direction, when angular velocity acts around the Z-axis in FIG. 16, Coriolis force is generated at the beam structure 101 in the Y-axis direction. In this case, the beam structure 101 is oscillated in the Y-axis direction. Therefore, the angular velocity sensor having the above-described detecting electrode arrangement can also detect an angular velocity acting around the Z-axis based on oscillation (displacement) of the beam structure 101 in the Y-axis direction.

Figure 17:
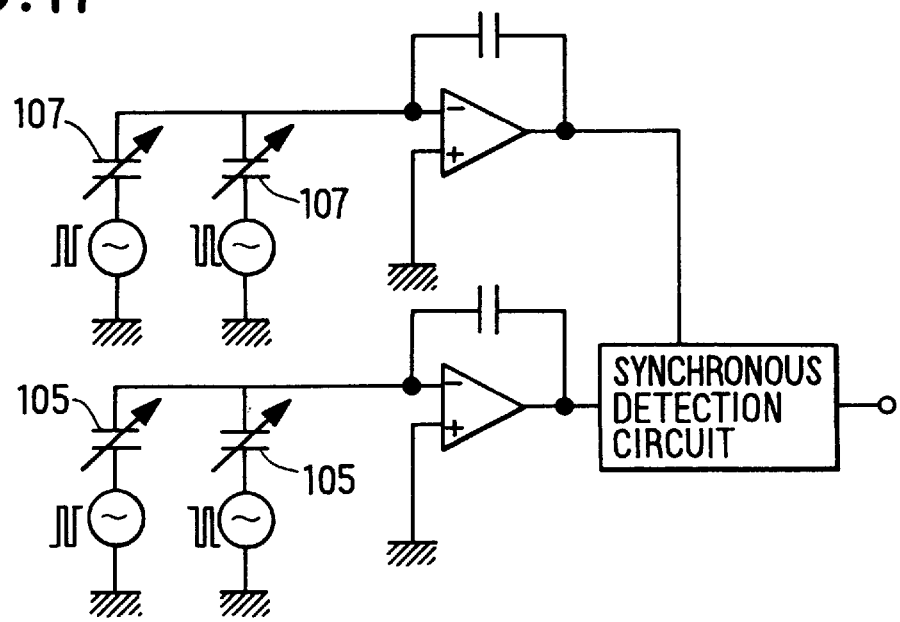
FIG. 17 is a circuit diagram adopted for the electrostatic capacitance type angular velocity sensor shown in FIG. 16.

In these angular velocity sensors also, the capacitance of the feedback electrode group 107 is set to be substantially equal to that of the detecting electrode group 105. As a result, in a circuit as shown in FIG. 17, the phase difference between the feedback signal and the detection signal can be made substantially zero. Therefore, the offset noise components can be cancelled by the synchronous detection. As described in the second embodiment, a capacitance correction element may be connected in parallel to the feedback electrode group 107 to substantially equalize the capacitance of the the feedback electrode group 107 to that of the detecting electrode group 105.

It is to be noted that a 90° phase shifter and a BPF are omitted in FIGS. 13 and 17.

What is claimed is:

1. An angular velocity sensor comprising:
   an oscillator having a pair of arms, each arm having a main surface and extending parallel to the other arm of the pair;
   a driving element configured for oscillating said oscillator in a direction of an X-axis in a three-axis rectangular coordinate system defined by said X-axis, a Y-axis and a Z-axis;
   a pair of detecting elements, each detecting element being respectively formed on one region of said main surface of one arm of the pair of arms, the pair of detecting elements being configured for generating signals in accordance with an oscillating state of said oscillator in a direction of either one of said Y-axis and said Z-axis;
   a pair of feedback elements, each feedback element being respectively formed on another region of said main surface of one arm of the pair of arms, the pair of feedback elements being configured for generating signals in accordance with an oscillating state of said oscillator in a direction of said Y-axis; and
   a circuit unit configured (i) for driving said driving element based on said signals generated from said pair of feedback elements, and (ii) for outputting an angular velocity signal by carrying out synchronous detection of said signals generated from said pair of detecting elements with respect to said signals from said pair of feedback elements, while said oscillator is oscillated in a direction of said X-axis,
   wherein electrostatic capacitances of said feedback elements are substantially equal to electrostatic capacitances of said detecting elements.

2. An angular velocity sensor according to claim 1, wherein said feedback element is equal in area to said detecting element, and said feedback element is formed on a surface of said oscillator at a position being offset in a direction of said X-axis from said detecting element which is also formed on said surface of said oscillator.

3. An angular velocity sensor according to claim 1, wherein said detecting element includes a first detecting element and a second detecting element generating signals of negative phase to each other, and said feedback element includes a first feedback element and a second feedback element generating signals in-phase to each other, and said circuit unit comprises a differential amplification circuit which differentially amplifies said signals from said first detecting element and said second detecting element and an addition and amplification circuit which amplifies an added signal of said signals from said first feedback element and said second feedback element.

4. An angular velocity sensor according to claim 3, wherein said circuit unit comprises a 90° phase shifter for shifting a phase of said signal generated from said addition and amplification circuit by 90°.

5. An angular velocity sensor according to claim 4, wherein said circuit unit comprises a synchronous detection circuit which carries out synchronous detection of said signal from said detecting element based on a signal of which phase is shifted 90° by said 90° phase shifter.

6. An angular velocity sensor according to claim 1, wherein said oscillator is formed by etching a semiconductor substrate.

7. An angular velocity sensor according to claim 6, wherein said semiconductor substrate is a silicon substrate.

8. An angular velocity sensor comprising:
   an oscillator;
   a driving element for oscillating said oscillator in a direction of an X-axis in a three-axis rectangular coordinate system defined by said X-axis, a Y-axis and a Z-axis;
   a detecting element for generating a signal in accordance with an oscillating state of said oscillator in a direction of either one of said Y-axis and said Z-axis;
   a feedback element for generating a signal in accordance with an oscillating state of said oscillator in a direction of said Y-axis; and
   a circuit unit for driving said driving element based on said signal generated from said feedback element, and for outputting an angular velocity signal by carrying out synchronous detection of said signal generated from the detecting element with respect to said signal from said feedback element, while said oscillator is oscillated in a direction of said X-axis;
   wherein electrostatic capacitance of said feedback element is substantially equal to electrostatic capacitance of said detecting element; and
   wherein each of said driving element, said detecting element and said feedback element is made of piezoelectric material and formed on a surface of said oscillator which is perpendicular to said Y-axis, and said detecting element generates a signal in accordance with an oscillating state of said oscillator in a direction of said Y-axis which is caused by angular velocity acting around said Z-axis.

9. An angular velocity sensor comprising:
   an oscillator;
   a driving element for oscillating said oscillator in a direction of an X-axis in a three-axis rectangular coordinate system defined by said X-axis, a Y-axis and a Z-axis;
   a detecting element for generating a signal in accordance with an oscillating state of said oscillator in a direction of either one of said Y-axis and said Z-axis;
   a feedback element for generating a signal in accordance with an oscillating state of said oscillator in a direction of said X-axis;
   a circuit unit for driving said driving element based on said signal generated from said feedback element, and for outputting an angular velocity signal by carrying out synchronous detection of said signal generated from the detecting element with respect to said signal from said feedback signal, while said oscillator is oscillated in a direction of said X-axis; and
   a capacitance correction element connected in parallel to said feedback element so that composite electrostatic capacitance of said feedback element and said capacitance correction element is substantially equal to electrostatic capacitance of said detecting element.

10. An angular velocity sensor according to claim 9, wherein said detecting element includes a first detecting element and a second detecting element generating signals of negative phase to each other, and said feedback element includes a first feedback element and a second feedback element generating signals in-phase to each other, and said circuit unit comprises a differential amplification circuit which differentially amplifies said signals from said first detecting element and said second detecting element and an addition and amplification circuit which amplifies an added signal of said signals from said first feedback element and said second feedback element.

11. An angular velocity sensor according to claim 10, wherein said circuit unit comprises a 90° phase shifter for shifting a phase of said signal generated from said addition and amplification circuit by 90°.

12. An angular velocity sensor according to claim 11, wherein said circuit unit comprises a synchronous detection circuit which carries out synchronous detection of said signal from said detecting element based on a signal of which phase is shifted 90° by said 90° phase shifter.

13. An angular velocity sensor according to claim 9, wherein said oscillator has a beam structure located a predetermined distance above a surface of a substrate, each of said driving element, said detecting element and said feedback element includes movable electrodes formed on a surface of said beam structure which is perpendicular to said X-axis and fixed electrodes disposed on said substrate to be interleaved with said movable electrodes, and said detecting element generates, from capacitance change between said movable electrodes and said fixed electrodes, a signal in accordance with an oscillating state of said beam structure in a direction of said Y-axis which is caused by angular velocity acting around said Z-axis.

14. An angular velocity sensor according to claim 9, wherein said oscillator has a beam structure located a predetermined distance above a surface of a substrate, each of said driving element, said detecting element and said feedback element includes movable electrodes formed on a surface of said beam structure which is perpendicular to said X-axis and fixed electrodes disposed on said substrate to be interleaved with said movable electrodes, and said detecting element generates, from capacitance change between said movable electrodes and said fixed electrodes, a signal in accordance with an oscillating state of said beam structure in a direction of said Z-axis which is caused by angular velocity acting around said Y-axis.

15. An angular velocity sensor according to claim 9, wherein:
electrostatic capacitance of said feedback element is smaller than that of said detecting element; and
a combination of electrostatic capacitance of said capacitance correction element and that of said feedback element is equal to said combination of electrostatic capacitance of the detecting element.

16. An angular velocity sensor according to claim 15, wherein said oscillator has a pair of arms, each arm of the pair having a main surface and extending parallel to the other arm of the pair, the oscillator being supported by an outer frame;
wherein said detecting element includes a pair of detecting elements, each detecting element being formed on one region of said main surface of each arm of the pair of arms;
wherein said feedback element includes a pair of feedback elements, each feedback element being formed on another region of said main surface of each arm, and the pair of elements having an area smaller than area of the detecting elements; and
wherein the capacitance correction element is formed on said outer frame.

17. An angular velocity sensor comprising:
an oscillator;
a driving element for oscillating said oscillator in a direction of an X-axis in a three-axis rectangular coordinate system defined by said X-axis, a Y-axis and a Z-axis;
a detecting element for generating a signal in accordance with an oscillating state of said oscillator in a direction of either one of said Y-axis and said Z-axis;
a feedback element for generating a signal in accordance with an oscillating state of said oscillator in a direction of said Y-axis; and
a circuit unit for driving said driving element based on said signal generated from said feedback element, and for outputting an angular velocity signal by carrying out synchronous detection of said signal generated from the detecting element with respect to said signal from said feedback element, while said oscillator is oscillated in a direction of said X-axis; and
a capacitance correction element connected in parallel to said feedback element so that composite electrostatic capacitance of said feedback element and said capacitance correction element is substantially equal to electrostatic capacitance of said detecting element;
wherein said oscillator is formed by etching a semiconductor substrate, each of said driving element, said detecting element and said feedback element is formed on a surface of said oscillator, and said capacitance correction element is formed on a surface of said semiconductor substrate for encompassing and supporting said oscillator.

18. An angular velocity sensor according to claim 17, further comprising:
a detecting element electrode pad formed on a surface of said semiconductor substrate for encompassing and supporting said oscillator, for sending out a signal from said detecting element to said circuit unit; and
a feedback element electrode pad formed on a surface of said semiconductor substrate for encompassing and supporting said oscillator, for sending out a signal from said feedback element to said circuit unit,
wherein an area of said detecting element electrode pad is different from an area of said feedback element electrode pad to compensate capacitance difference between respective wires connected thereto.

19. An angular velocity sensor according to claim 17, wherein said semiconductor substrate is a silicon substrate.

20. An angular velocity sensor comprising:
an oscillator;
a driving element for oscillating said oscillator in a direction of an X-axis in a three-axis rectangular coordinate system defined by said X-axis, a Y-axis and a Z-axis;
a detecting element for generating a signal in accordance with an oscillating state of said oscillator in a direction of either one of said Y-axis and said Z-axis;
a feedback element for generating a signal in accordance with an oscillating state of said oscillator in a direction of said Y-axis; and
a circuit unit for driving said driving element based on said signal generated from said feedback element, and for outputting an angular velocity signal by carrying out synchronous detection of said signal generated from the detecting element with respect to said signal from said feedback element, while said oscillator is oscillated in a direction of said X-axis; and a capacitance correction element connected in parallel to said feedback element so that composite electrostatic capacitance of said feedback element and said capacitance correction element is substantially equal to electrostatic capacitance of said detecting element;

wherein each of said driving element, said detecting element and said feedback element is made of piezoelectric material and formed on a surface of said oscillator which is perpendicular to said Y-axis, and said detecting element generates a signal in accordance with an oscillating state of said oscillator in a direction of said Y-axis which is caused by angular velocity acting around said Z-axis.

21. An angular velocity sensor comprising:

an oscillator having a pair of arms, each arm having a main surface and extending parallel to the other arm of the pair;

a driving element configured for oscillating said oscillator in a direction of an X-axis in a three-axis rectangular coordinate system defined by said X-axis, a Y-axis and a Z-axis;

a pair of detecting elements, each detecting element being respectively formed on one region of said main surface of one arm of the pair of arms, the pair of detecting elements being configured for generating signals in accordance with an oscillating state of said oscillator in a direction of either one of said Y-axis and said Z-axis;

a pair of feedback elements, each feedback element being respectively formed on another region of said main surface of one arm of the pair of arms, the pair of feedback elements being configured for generating signals in accordance with an oscillating state of said oscillator in a direction of said Y-axis;

a first amplification circuit configured for receiving said signals from said pair of detecting elements while said oscillator is oscillated in the direction of said X-axis by said driving element;

a second amplification circuit configured for receiving said signals from said pair of feedback elements while said oscillator is oscillated in the direction of said X-axis by said driving element, and configured for generating a driving signal for driving said driving element based on said signals from said pair of feedback elements;

a synchronous detection circuit configured for carrying out synchronous detection of a signal generated from said first amplification circuit based on said driving signal generated from said second amplification circuit; and a circuit unit configured for outputting an angular velocity signal based on a signal generated from said synchronous detection circuit, wherein electrostatic capacitances of said feedback elements are substantially equal to electrostatic capacitances of said detecting elements so that a phase difference between said signal generated from said first amplification circuit and said signal generated from said second amplification circuit is equal to or lower than 2°.

22. An angular velocity sensor according to claim 21, wherein said detecting element includes a first detecting element and a second detecting element generating signals of negative phase to each other, and said first amplification circuit is a differential amplification circuit which differentially amplifies said signals from said first detecting element and said second detecting element, and said feedback element includes a first feedback element and a second feedback element generating signals in-phase to each other, and said second amplification circuit is an addition and amplification circuit which amplifies an added signal of said signals from said first feedback element and said second feedback element.

23. An angular velocity sensor according to claim 22, further comprising a 90° phase shifter provided between said addition and amplification circuit and said synchronous detection circuit, for shifting a phase of said signal generated from said addition and amplification circuit by 90°.

24. An angular velocity sensor according to claim 21, wherein said oscillator is formed by etching a semiconductor substrate.

25. An angular velocity sensor according to claim 24, wherein said semiconductor substrate is a silicon substrate.

26. An angular velocity sensor comprising:

an oscillator;

a driving element for oscillating said oscillator in a direction of an X-axis in a three-axis rectangular coordinate system defined by said X-axis, a Y-axis and a Z-axis;

a detecting element for generating a signal in accordance with an oscillating state of said oscillator in a direction of either one of said Y-axis and said Z-axis;

a feedback element for generating a signal in accordance with an oscillating state of said oscillator in a direction of said Y-axis;

a first amplification circuit for receiving said signal from said detecting element while said oscillator is oscillated in a direction of said X-axis by said driving element;

a second amplification circuit for receiving said signal from said feedback element while said oscillator is oscillated in a direction of said X-axis by said driving element, and for generating a driving signal for driving said driving element based on said signal from said feedback element;

a synchronous detection circuit for carrying out synchronous detection of a signal generated from said first amplification circuit based on said driving signal from said second amplification circuit; and a circuit unit for outputting an angular velocity signal based on a signal generated from said synchronous detection circuit;

wherein electrostatic capacitance of said feedback element is substantially equal to electrostatic capacitance of said detecting element so that a phase difference between said signal fed to said synchronous detection circuit from said detecting element and said signal fed thereto from said feedback element is equal to or lower than 2°; and wherein each of said driving element, said detecting element and said feedback element is made of piezoelectric material and formed on a surface of said oscillator which is perpendicular to said Y-axis, and said detecting element generates a signal in accordance with an oscillating state of said oscillator in a direction of said Y-axis which is caused by angular velocity acting around said Z-axis.

* * * * *